No. 655,057.  
H. G. CARLETON.  
THERMOSTAT AND ALARM CIRCUIT CONTROLLED THEREBY.  
(Application filed Sept. 8, 1899.)

Patented July 31, 1900.

(No Model.)  
3 Sheets—Sheet 1.

WITNESSES  
Geo H Botts  
J. F. Kehoe

INVENTOR  
Henry Guy Carleton  
BY  
Philipp Phelps Sawyer  
ATTORNEYS

No. 655,057. Patented July 31, 1900.
H. G. CARLETON.
THERMOSTAT AND ALARM CIRCUIT CONTROLLED THEREBY.
(Application filed Sept. 8, 1899.)
(No Model.) 3 Sheets—Sheet 2.
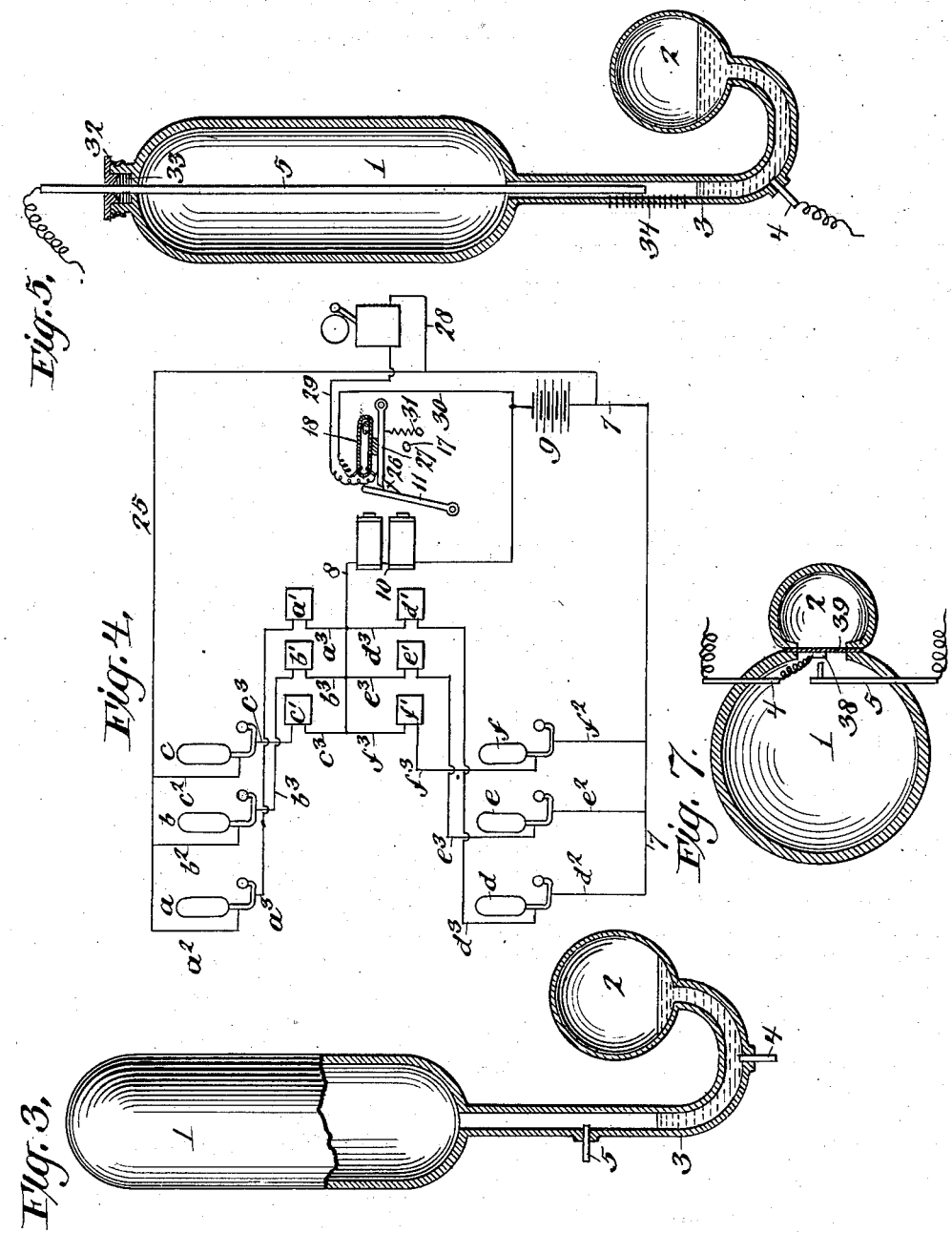

No. 655,057. Patented July 31, 1900.
H. G. CARLETON.
THERMOSTAT AND ALARM CIRCUIT CONTROLLED THEREBY.
(Application filed Sept. 8, 1899.)
(No Model.) 3 Sheets—Sheet 3.
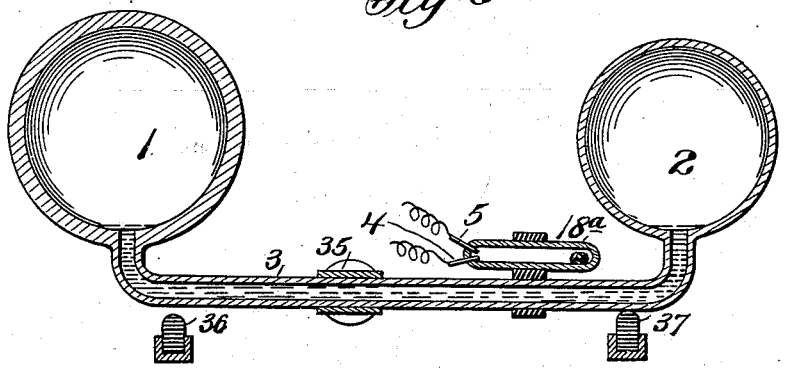
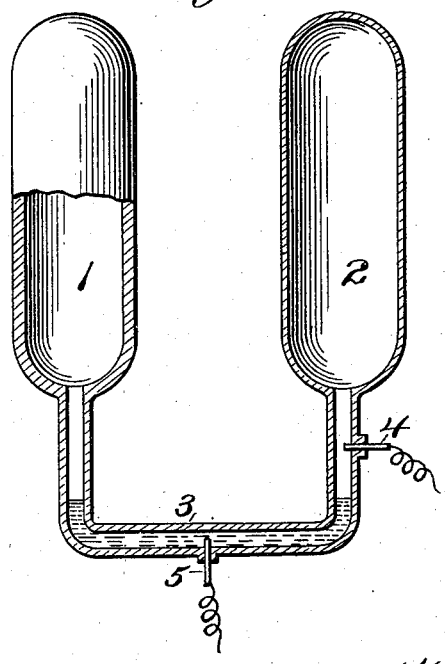

UNITED STATES PATENT OFFICE.

HENRY GUY CARLETON, OF NEW YORK, N. Y., ASSIGNOR TO THE CARLETON ELECTRIC COMPANY, OF SAME PLACE.

THERMOSTAT AND ALARM CIRCUIT CONTROLLED THEREBY.

SPECIFICATION forming part of Letters Patent No. 655,057, dated July 31, 1900.

Application filed September 8, 1899. Serial No. 729,796. (No model.)

*To all whom it may concern:*

Be it known that I, HENRY GUY CARLETON, a citizen of the United States, residing at Manhattan borough, city and county of New York, State of New York, have invented certain new and useful Improvements in Thermostats and Fire-Alarm Circuits Controlled Thereby, fully described and represented in the following specification and the accompanying drawings, forming a part of the same.

This invention relates, primarily, to improvements in thermostats, it being the object of this branch of the present invention to provide a thermostat which will be reliable, certain, and instantaneous in its operation on a sudden thermal change, which will be equally effective without adjustment throughout a wide range of temperature, such as that occurring during a day or other period of time or between seasons, and which also will be unaffected by normal changes in temperature taking place gradually, so as to avoid operation of the thermostat at undesired times.

The thermostat of the present invention is adapted to be operated by a sudden thermal change in either direction—as, for example, a sudden rise in temperature due to the breaking out of a fire or a sudden fall in temperature due to the approach toward each other of a ship and iceberg.

It is also the object of the present invention to construct the thermostat in such way as to adapt it not only for operation upon a sudden thermal change, but for operation upon a gradual rise in temperature above normal conditions, such as might be produced by a smoldering fire.

The invention also relates to improvements in fire-alarm circuits controlled by thermostats such as above referred to. It also relates to certain details in the construction of the thermostat and in the arrangement of electric terminals therefor.

Figure 1:
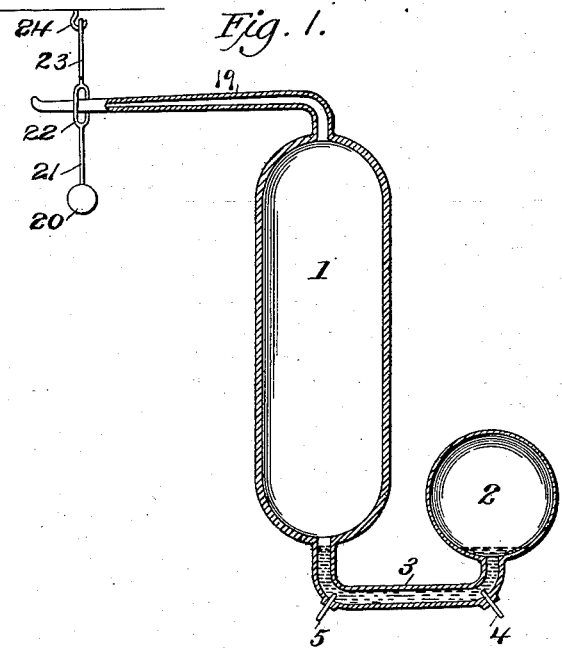
Figure 2:
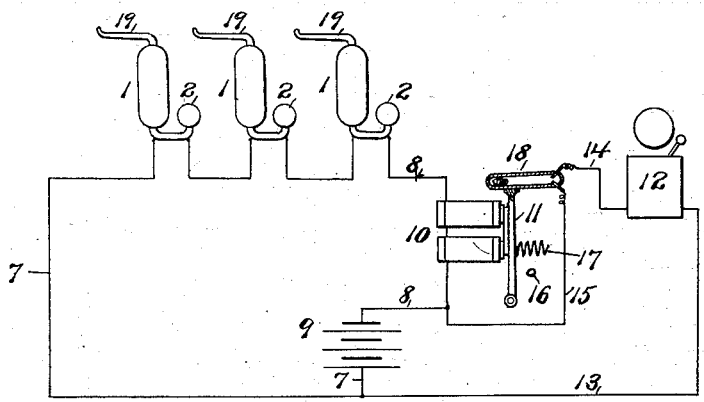

In the accompanying drawings, Figure 1 is a sectional elevation of a thermostat embodying the present invention in its preferred form. Fig. 2 is a diagrammatic view illustrating a series of such thermostats in a normally-closed electric fire-alarm circuit. Fig. 3 is a sectional elevation of another form of thermostat embodying the present invention. Fig. 4 is a diagrammatic view illustrating a series of such thermostats in a normally-open electric fire-alarm circuit. Figs. 5 to 7 are sectional elevations of other modified forms of thermostats embodying the present invention, which will be hereinafter described in detail; and Fig. 8 is a sectional elevation of a thermostat embodying the present invention designed for operation on a sudden fall of temperature instead of a sudden rise of temperature.

The thermostats of the several figures differ from each other in certain particulars, but they each include two coacting hermetically-closed chambers or bulbs of unequal thermal sensitiveness containing a gaseous substance and so connected that the pressures therein will be opposed, so that during gradual or normal changes in temperature both bulbs or chambers are affected thereby substantially to the same extent and the opposing pressures in both maintained substantially equal, but on a sudden and substantial thermal change the bulb or chamber of greater sensitiveness is first affected, so as to cause a difference in the relative pressures in the two bulbs or chambers and a corresponding movement relatively to the terminals of the circuit in which the thermostat is located of a displaceable circuit-closer carried by or connected to the thermostat. The term "circuit-terminals" is used herein in its ordinary sense—namely, as indicating terminals leading from a source of electric energy, as, for example, a battery to the circuit-closer—and not as indicating the electrodes or elements of the source of electric energy depended upon for the work to be done, and the term "circuit-closer" also is used herein in its ordinary sense—namely, as indicating means capable of closing the circuit between two such terminals. The circuit-closer of the present case preferably will be located in the interior of the thermostat, so as to be displaced directly by the excess of pressure in one bulb or chamber over that in the other; but it may be connected to the thermostat in such way as to be displaced on a rocking or other bodily movement of the latter.

It is immaterial to the present invention, broadly considered, what gaseous substance be employed in the chambers or bulbs. It may be a permanently-gaseous substance or be formed by the volatilization of volatile substances of low boiling-point and may consist of carbon dioxid, sulfuric ether, air, or any other gaseous substances or mixtures thereof. It is also immaterial to the present invention, broadly considered, what the character of the displaceable circuit-closer carried by or connected to the thermostat may be; but it will preferably be fluid, and the fluid which I prefer is mercury, though other fluids—as sulfuric acid or a solution of mineral salts, &c.—may be employed. Where, however, mercury is employed as the circuit-closer and it is located in the thermostat so as to contact with the gaseous substance in the bulbs or chambers, I prefer that the gaseous substance employed in the chambers or bulbs should be carbon dioxid, which will not oxidize the mercury. It will be understood, therefore, that any suitable gaseous substance and any suitable circuit-closing means carried by or connected to the thermostat may be employed without departing from the invention, broadly considered, in place of those referred to in the detailed description, which will now be given, of the various forms of thermostats illustrated in the drawings.

Referring now to Figs. 1 and 2, the thermostat and electric fire-alarm apparatus illustrated therein will first be described. The thermostat shown in Fig. 1 consists of a pair of hermetically-closed chambers or bulbs 1 2, of glass or other suitable material, containing a gaseous substance and communicating with each other through a contracted passage or tube 3 of like material, containing a fluid circuit-closer, as mercury, and having terminals 4 5 for an electric circuit, which enter the tube, through hermetically-sealed openings, in position to contact with the mercury in said tube, these terminals 4 5 being preferably of some metal which, like platinum, is not easily amalgamable. The circuit in which the thermostat of Fig. 1 is designed to be used is a normally-closed circuit, and the terminals 4 5 therefore enter the tube 3 in such position as to be normally in contact with the mercury or other conductive fluid therein, as illustrated in Fig. 1. With a slight change in the position of the terminals, or one of them, the thermostat would be applicable to a normally-open circuit, as illustrated in other figures of the drawings. If both of the bulbs 1 2 of the thermostat of Fig. 1 were of equal sensitiveness to thermal changes, they would of course be equally and simultaneously affected by any sudden and substantial change in temperature, such as that produced on the sudden breaking out of a fire, and the mercury or other fluid interposed between the two bulbs in the tube 3 would in such case not be displaced, but would be maintained in equilibrium, as the pressure in both bulbs would of course be equal, or substantially so. In the present case, however, the bulbs 1 2 are of unequal sensitiveness, the bulb 1 being less sensitive to sudden thermal changes than is the bulb 2, so that on a sudden rise in temperature the bulb 2 is first affected thereby and the pressure therein increased over that in the bulb 1, with the result that the mercury or other fluid in the tube 3 is driven by the excess of pressure in bulb 2 toward the bulb 1 and out of contact with terminal 4, thus breaking the circuit in which the thermostat is located, while during normal or gradual changes in temperature the pressures in the two bulbs coact to maintain the mercury or other fluid in equilibrium or in contact with both circuit-terminals 4 5. This inequality in sensitiveness between the bulbs 1 2 is obtained by making the walls of bulb 1 of greater thickness than the walls of bulb 2, the difference in thickness of the two bulbs depending upon the difference required in sensitiveness between the two bulbs. The more sensitive bulb 2 should be as thin as possible in order that it may be instantaneously responsive to sudden thermal changes, and the difference between the two bulbs in thermal sensitiveness should be such that the thermostat will not respond to gradual or normal thermal changes, but only to sudden or unusual and substantial thermal changes, such as produced by the sudden breaking out of a fire. The circuit in which the thermostat is located may be of any character and may include any suitable source of electric energy, as a battery outside the thermostat, and any form of mechanism for giving an alarm audibly or otherwise or for performing any other desired function. The circuit and alarm mechanism, however, which I prefer for some purposes is that illustrated in Fig. 2, including a plurality of thermostats, each connected with a main circuit 7 8, including a battery 9 and drop-relay magnet 10, controlling, through its armature 11, a branch circuit, including a bell 12, and consisting of wires 13 14, connected with wire 7 and leading from one pole of battery 9 and wire 15, connected to wire 8 and leading to the opposite pole of said battery. As before stated and as shown, the main circuit 7 8 is normally closed, so that the magnet 10 is normally energized, thus maintaining the bell-circuit in an open condition. On a sudden rise of temperature, such as that produced by the sudden breaking out of a fire, the bulb 2 will be instantly affected thereby and the pressure therein caused to exceed that in the thicker bulb 1, with the result that the fluid in the tube 3 is driven by the pressure in bulb 2 toward the bulb 1 and out of contact with the terminal 4, thus breaking the circuit 7 8 and deënergizing magnet 10, the armature 11 of which is then released and falls to its rearward position against a stop 16, aided, preferably, by a spring 17. Upon the armature 11 is mounted a hermetically-sealed and preferably-exhausted tube 18, containing a drop of mercury and terminals leading from wires 14 15 of the bell-circuit.

In the forward position of the armature 11 against the magnet 10 the tube 18 is tilted, so that the drop of mercury therein rests at the end of the tube opposite that occupied by the terminals of wires 14 15; but when said armature is released and falls against stop 16 the tube 18 will be inclined in the opposite direction and the drop of mercury therein moved into contact with the terminals of wires 14 15, thus closing the bell-circuit and continuously ringing the bell 12. The bell-circuit will thereafter remain closed, continuously ringing the bell 12, regardless of the destruction of the thermostats. If desired, there may be provided in addition to the alarm mechanism an annunciator for the several thermostats, as hereinafter described.

Although the invention broadly considered is not to be limited to a closed circuit or to a circuit including a drop-relay controlling the alarm mechanism, yet such closed circuit and such drop-relay are preferred, because with a closed circuit it is impossible for the connections to get out of order without immediate detection, and the thermostats therein may be each readily tested daily, and, furthermore, with a drop-relay immediately upon the operation of a thermostat the bell-circuit is rendered independent of such thermostat and continuous ringing of the bell thus secured regardless of the destruction of such thermostat.

In the case of a smoldering fire it is possible that there might be no sudden rise of temperature sufficient to operate the thermostat in the manner described, the rise being so gradual as to equally and simultaneously affect both the bulbs 1 2, the pressures in which would then maintain the fluid in tube 3 in contact with both of the terminals 4 5. It is desirable to provide for this contingency, and for this reason the bulb 1 of Figs. 1 and 2 is provided at its upper end with a very fragile portion consisting of a finely-drawn-out tubular stem 19, communicating with the interior of said bulb and the outer end of which is adapted to be engaged and broken, so as to release the contents of the bulb 1 by any suitable means—as, for example, a weight, as 20, secured by a fusible connection with the ceiling or other part of the building in which the thermostat may be located. In the present case the means whereby the weight 20 is held in position to engage the stem 19 and by which it is suspended from the ceiling or other part of the room or building consists of a wire 21, connected with the weight and provided at its upper end with a loop 22, embracing the stem 19 and connected by a fusible wire 23, (fusible, say, at 130°,) attached to a hook 24, secured to the ceiling or other part of the room or building. From this construction it results that in case of a smoldering fire, when the temperature about the thermostat reaches, say, 130°, or any other fixed point above normal conditions, the wire 23 will be fused, thus releasing the wire 21 and its weight 20, with the result that as the latter descend they will exert upon the stem 19 a strain sufficient to break the latter. As the stem 19 is thus broken the bulb 1 is opened to the atmosphere and the pressure therein reduced below that in the bulb 2, so that the latter will force the fluid in the tube 3, as before described, toward the bulb 1 and out of contact with the terminal 4, thus breaking the main circuit 7 8 and closing the bell-circuit. The connection between the weight 20 and the stem 19 will preferably be a loose connection, so that when the weight is released by the fusing of the wire 23 it will acquire a certain amount of momentum before it comes in contact with the stem 19, so as to insure breakage of the latter. For this reason the loop 20 is elongated, and when in position about the stem 19 the upper end of said loop will be out of contact with said stem, as illustrated in Fig. 1.

As the movement of the fluid in tube 3 is resisted by the pressure in the bulb 1, the latter, in order to reduce such resistance so as to secure free and rapid movement of the fluid, is made larger than the bulb 2 and preferably about three times the size of the latter.

The thermostat of Fig. 3 differs from that of Fig. 1 in the shape and arrangement of tube 3 relatively to the bulbs 1 and 2 and in the arrangement of the terminals 4 5, the thermostat of this figure being designed for use in a normally-open circuit, and the terminal 5 therefore being normally out of contact with the fluid in tube 3. It also differs from the thermostat in Fig. 1 in the omission of the stem 19, though, if desired, the thermostat of Fig. 3, as well as the thermostats of the other figures of the drawings, might obviously, if desired, be equipped with such stems.

In the diagrammatic view, Fig. 4, is illustrated a series of thermostats such as illustrated in Fig. 3 in combination with circuit connections, including annunciators and alarm mechanism suitable for use in hotels, apartment-houses, or similar buildings, or in a series of buildings. For convenience of description the thermostats of this figure are designated as $a$ $b$ $c$ $d$ $e$ $f$. Each of these thermostats is provided with an annunciator, these annunciators being designated, respectively, $a'$ $b'$ $c'$ $d'$ $e'$ $f'$. The upper terminals 5 of the several thermostats $a$ $b$ $c$ are connected by wires $a^2$ $b^2$ $c^2$, respectively, and wire 25 to wire 7, leading from one pole of battery 9, and the lower terminals 4 of said thermostats are connected by wires $a^3$ $b^3$ $c^3$, which include the annunciators $a'$ $b'$ $c'$, respectively, to wire 8, including drop-relay magnet 10 and leading to the opposite pole of said battery. The lower terminals 4 of thermostats $d$ $e$ $f$ are connected by wires $d^2$ $e^2$ $f^2$, respectively, to wire 7, while the upper terminals 5 of said thermostats are connected by wires $d^3$ $e^3$ $f^3$, including annunciators $d'$ $e'$ $f'$, to wire 8. The circuit of this figure is a normally-open one, so that normally the armature 11 of magnet 10 is in its rearward position, and in this position by means of a catch 26 retains a lever 27 in elevated position, said lever carrying a tube 18, containing a drop of mercury for closing the bell-circuit. This bell-circuit consists of wire 7 from one pole of battery 9, wires 25 28 29, the terminal of which latter enters tube 18, wire 30, the terminal of which also enters said tube, and wire 8, leading to the opposite pole of battery 9. As the construction and operation of the several thermostats is the same, a description of the operation of one will suffice for an understanding of all. Selecting, therefore, the thermostat $d$, upon a sudden rise of temperature to a substantial extent the fluid in the tube 3 will be driven by the excess of pressure in bulb 2 toward bulb 1 and into contact with the terminal 5, thus closing the circuit through wires $d^2$ 7, battery 9, wire 8, including magnet 10, and wire $d^3$, including annunciator $d'$. With the circuit thus closed magnet 10 is energized and attracts its armature 11, which then releases the lever 27. As the lever 27 is thus released it falls into engagement (aided, if desired, by a spring 31) with a stop 17, and thereby tilts tube 18, the mercury wherein then contacts with the terminals of wires 29 30, and thus closes the bell-circuit and rings the bell 12. The bell-circuit will remain thus closed, continuously ringing the alarm, regardless of the destruction of the thermostat by the fire or any other change which may take place in its condition after its operation.

The thermostat illustrated in Fig. 5 differs from that illustrated in Fig. 3 in that the upper terminal 5 instead of occupying a fixed position in the tube 3 consists of a long rod or wire mounted in a stuffing-box at the upper end of bulb 1, so that it may be adjusted to any desired position relatively to the fluid contained in said tube. The stuffing-box in which the terminal 5 is thus mounted consists of a cap 32, adapted to be screwed on a correspondingly-threaded neck formed on bulb 1, and a packing 33, of rubber or the like, inclosing the rod 5 and adapted to be compressed by a projection on the under side of the cap 32 as the latter is screwed into position, and to thus hermetically seal bulb 1 at its upper end. For convenience in adjusting the terminal 5 the tube 3 may be provided with a scale 34, graduated so as to represent different degrees of temperature.

In the thermostats of Figs. 1 to 5 the fluid contained within the tube 3 forms part of the circuit in which the thermostat is located, such circuit in one case being normally closed and broken by movement of the fluid in tube 3 out of contact with one terminal, and in other cases normally open and closed by the movement of said fluid into contact with one terminal. In the thermostat illustrated in Fig. 6, however, the fluid or other material in tube 3 forms no part of the circuit and merely acts to rock and alter the position of the thermostat, so as to displace fluid circuit-closing means connected to and carried by the thermostat, which will presently be described. The thermostat of this figure consists of bulbs 1 2, connected by a tube 3, which is pivotally mounted at 35, so as to rock into and out of contact with stops 36 37. As the fluid in tube 3 forms no part of the circuit, any suitable non-conducting substance or fluid may be employed in place of mercury or the like. Normally the thermostat of this figure occupies the position in which it is shown—namely, resting against the stop 37—and no change in this position will result from a gradual rise in temperature. Upon a sudden rise in temperature, however, the bulb 2, as before, will be affected thereby and the fluid within the tube 3 be driven by the excess of pressure within said bulb into the bulb 1. When the fluid has thus been driven into the bulb 1, there will be a preponderance of weight at that end of the tube 3, which will cause the tube 3 to rock on its pivot 35 and fall against the stop 36 and out of engagement with the stop 37. Mounted upon the tube 3 is a hermetically-sealed and exhausted tube 18$^a$, provided at one end with terminals 4 5 and with a drop of mercury constituting the circuit-closer for said terminals, and which when the tube 3 rests against the stop 37 lies at the end of the tube opposite that occupied by the terminals 4 5. When the tube 3 is rocked into engagement with the stop 36, the tube 18$^a$ will move therewith and the drop of mercury therein move into engagement with the terminals 4 5, thus closing the circuit in which the thermostat is located.

In Figs. 1 to 6 the circuit-closer carried by each of the thermostats is fluid. In the thermostat illustrated in Fig. 7 it consists of a metal plate 38, borne by a diaphragm 39, of rubber or other suitable material, interposed between the two chambers. The terminal 4 is connected with plate 38, while the other terminal 5 enters the thermally-insulated bulb 1 in position to contact with plate 38 when the diaphragm 39 and said plate are displaced by excess of pressure in bulb 2, so as to close the circuit in which the thermostat may be located.

The thermostats of Figs. 1 to 7 are all designed for operation upon a sudden rise in temperature, such as that produced by the sudden breaking out of fire, though with slight changes they could be adapted for operation on a sudden fall in temperature. The thermostat illustrated in Fig. 8, however, is designed for operation upon a sudden fall in temperature, such as that produced by the approach toward each other of an iceberg and ship. In this case the gas-bulbs 1 and 2 are of substantially the same size, but of unequal thickness, as in the preceding figures. Upon a sudden fall of temperature the bulb 2, as in the case of a sudden rise in temperature, will be first affected by such sudden fall and the pressure therein reduced below that in the bulb 1, with the result that the fluid contained within the tube 3 will be forced by the excess of pressure in bulb 1 toward the bulb 2 and into contact with terminal 4, thus closing the circuit. It will be obvious that by a slight change in the position of terminal 4 the thermostat of this figure could as well be applied to a normally-closed circuit.

It is to be understood that many modifications or changes other than those illustrated and described may be resorted to without departing from the spirit and scope of the invention. The invention therefore, broadly considered, is not to be limited to the constructions shown or described, but is to be regarded as generic in its nature.

It will be understood that the present invention is applicable to uses other than those heretofore referred to.

What I claim is—

1. In a fire-alarm apparatus the combination of an electric circuit including a source of electric energy and suitable alarm mechanism, a thermostat comprising two hermetically-closed chambers containing a gaseous substance and of unequal thickness, a circuit-closer controlled thereby, and circuit-terminals leading from the source of energy to and controlled by the circuit-closer, substantially as described.

2. In a fire-alarm apparatus the combination of an electric circuit including a source of electric energy and suitable alarm mechanism, a thermostat comprising two hermetically-closed chambers containing a gaseous substance and of unequal thickness, a fluid circuit-closer controlled thereby, and circuit-terminals leading from the source of energy to and controlled by the circuit-closer, substantially as described.

3. In a fire-alarm apparatus the combination of an electric circuit including a source of electric energy and suitable alarm mechanism, a thermostat comprising two hermetically-closed chambers containing a gaseous substance and of unequal thickness, a displaceable circuit-closer between said chambers, and circuit-terminals leading from the source of energy to and controlled by the circuit-closer, substantially as described.

4. In a fire-alarm apparatus the combination of an electric circuit including a source of electric energy and suitable alarm mechanism, a thermostat comprising two hermetically-closed chambers containing a gaseous substance and of unequal thickness, a fluid circuit-closer between said chambers, and circuit-terminals leading from the source of energy to and controlled by the circuit-closer, substantially as described.

5. In a fire-alarm apparatus the combination of an electric circuit including a source of electric energy and suitable alarm mechanism, a thermostat comprising two hermetically-closed chambers containing a gaseous substance and of unequal thickness, a circuit-closer of mercury controlled thereby, and circuit-terminals leading from the source of energy to and controlled by the circuit-closer, substantially as described.

6. In a fire-alarm apparatus the combination of an electric circuit including a source of electric energy and suitable alarm mechanism, a thermostat comprising two hermetically-closed chambers containing a gaseous substance and of unequal thickness, a circuit-closer of mercury between said chambers, and circuit-terminals leading from the source of energy to and controlled by the circuit-closer, substantially as described.

7. A thermostat comprising two coacting hermetically-closed chambers containing a gaseous substance and of unequal thickness and a circuit-closer controlled thereby, substantially as described.

8. A thermostat comprising two coacting hermetically-closed chambers containing a gaseous substance and of unequal thickness and a tubular connecting portion through which they coact and a circuit-closer controlled thereby, substantially as described.

9. A thermostat comprising two coacting hermetically-closed chambers of unequal thickness, a displaceable circuit-closer between said chambers, and circuit-terminals, controlled by said circuit-closer, for connection with a source of electric energy, substantially as described.

10. A thermostat comprising two hermetically-closed chambers of unequal thickness and a tubular connecting portion through which they coact containing a displaceable circuit-closer, and circuit-terminals, controlled by said circuit-closer, for connection with a source of electric energy, substantially as described.

11. A thermostat comprising two hermetically-closed chambers of unequal thickness and a tubular connecting portion through which they coact containing a circuit-closer of mercury, and circuit-terminals, controlled by said circuit-closer, for connection with a source of electric energy, substantially as described.

12. A thermostat comprising two coacting hermetically-closed chambers containing a gaseous substance and of unequal thermal sensitiveness, the less-sensitive chamber being of larger size than the other and a circuit-closer controlled thereby, substantially as described.

13. A thermostat comprising two coacting hermetically-closed chambers containing a gaseous substance and of unequal thickness, the chamber of greater thickness being of larger size than the other and a circuit-closer controlled thereby, substantially as described.

14. A thermostat comprising two coacting hermetically-closed chambers, one of said chambers being provided with a portion more fragile than the body thereof, substantially as described.

15. A thermostat comprising two coacting hermetically-closed chambers of unequal thermal sensitiveness, the less-sensitive chamber being provided with a portion more fragile than the body thereof, substantially as described.

16. A thermostat comprising two coacting hermetically-closed chambers, one of said chambers being provided with a fragile tubular stem communicating with its interior, substantially as described.

17. A thermostat comprising two coacting hermetically-closed chambers of unequal thermal sensitiveness, the less-sensitive chamber being provided with a fragile tubular stem communicating with its interior, substantially as described.

18. A thermostat comprising two coacting hermetically-closed chambers of unequal thickness, the thicker chamber being provided with a portion more fragile than the body thereof, substantially as described.

19. A thermostat comprising two coacting hermetically-closed chambers of unequal thickness, the thicker chamber being provided with a fragile tubular stem communicating with its interior, substantially as described.

20. A thermostat comprising bulbs 1, 2, connected so as to coact, bulb 1 being provided with fragile tubular stem 19, substantially as described.

21. A thermostat comprising bulbs 1, 2, and connecting-tube 3, bulb 1 being provided with fragile tubular stem 19, substantially as described.

22. In a fire-alarm apparatus the combination of a main circuit including a source of electric energy and a drop-relay, an alarm-circuit controlled by the latter, a thermostat in the main circuit comprising two coacting hermetically-closed chambers containing a gaseous substance and of unequal thickness, a circuit-closer controlled by the thermostat, and circuit-terminals leading from the source of electric energy to and controlled by the circuit-closer, substantially as described.

23. In a fire-alarm apparatus the combination of a main circuit including a source of electric energy and a drop-relay, an alarm-circuit controlled by the latter, a thermostat in the main circuit comprising two coacting hermetically-closed chambers containing a gaseous substance and of unequal thickness, a circuit-closer between the chambers, and circuit-terminals leading from the source of electric energy and entering the thermostat in position for contact with said circuit-closer substantially as described.

24. In a fire-alarm apparatus the combination of a main circuit including a source of electric energy and a drop-relay, an alarm-circuit controlled by the latter, a thermostat in the main circuit comprising two coacting hermetically-closed chambers containing a gaseous substance and of unequal thickness, a fluid circuit-closer between the chambers, and circuit-terminals leading from the source of electric energy and entering the thermostat in position for contact with said circuit-closer substantially as described.

25. In a fire-alarm apparatus the combination of a main circuit including a drop-relay, an alarm-circuit controlled by the latter, a thermostat in the main circuit comprising two coacting hermetically-closed chambers containing a gaseous substance and of unequal thermal sensitiveness, the less-sensitive chamber being provided with a portion more fragile than the body thereof, a device for engaging and breaking said fragile portion, fusible means for supporting said device out of breaking position, and a circuit-closer controlled by the thermostat, substantially as described.

26. In a fire-alarm apparatus the combination of a main circuit including a drop-relay, an alarm-circuit controlled by the latter, a thermostat in the main circuit comprising two coacting hermetically-closed chambers containing a gaseous substance and of unequal thermal sensitiveness, the less-sensitive chamber being provided with a fragile tubular stem communicating with its interior, a device for engaging and breaking said stem, fusible means for supporting said device out of breaking position, and a circuit-closer controlled by the thermostat, substantially as described.

27. In a fire-alarm apparatus the combination of a main circuit including a drop-relay, an alarm-circuit controlled by the latter, a thermostat in the main circuit comprising two coacting hermetically-closed chambers containing a gaseous substance and of unequal thermal sensitiveness, the less-sensitive chamber being provided with a portion more fragile than the body thereof, a device for engaging and breaking said fragile portion, fusible means for supporting said device out of breaking position, a fluid circuit-closer between the chambers, and circuit-terminals entering the thermostat in position for contact with said circuit-closer, substantially as described.

28. In a fire-alarm apparatus the combination of a main circuit including a drop-relay, an alarm-circuit controlled by the latter, a thermostat in the main circuit comprising two coacting hermetically-closed chambers containing a gaseous substance and of unequal thermal sensitiveness, the less-sensitive chamber being provided with a fragile tubular stem communicating with its interior, a device for engaging and breaking said stem, fusible means for supporting said device out of breaking position, a fluid circuit-closer between the chambers, and circuit-terminals entering the thermostat in position for contact with said circuit-closer, substantially as described.

29. In a fire-alarm apparatus the combination of a main circuit including a source of electric energy and a drop-relay, an alarm-circuit controlled by the latter, a thermostat in the main circuit comprising bulbs 1, 2, containing a gaseous substance and of unequal thickness, and tube 3 connecting said chambers and provided with a circuit-closing fluid and terminals 4, 5, leading from the source of electric energy and adapted to contact with said fluid, substantially as described.

30. In a fire-alarm apparatus the combination of a main circuit including a drop-relay, an alarm-circuit controlled by the latter, a thermostat in the main circuit comprising bulbs 1, 2, containing a gaseous substance and tube 3 connecting said chambers and provided with a circuit-closing fluid and terminals 4, 5, adapted to contact with said fluid, the bulb 1 being provided with fragile tubular stem 19, substantially as described.

31. In a fire-alarm apparatus the combination of a main circuit including a drop-relay, an alarm-circuit controlled by the latter, a thermostat in the main circuit comprising bulbs 1, 2, containing a gaseous substance and tube 3 connecting said chambers and provided with a circuit-closing fluid and terminals 4, 5, adapted to contact with said fluid, the bulb 1 being provided with fragile tubular stem 19, a weight 20 for engaging and breaking said stem, and fusible means for supporting said weight out of breaking position, substantially as described.

32. In a fire-alarm apparatus the combination of a main circuit including a source of electric energy and a drop-relay, an alarm-circuit controlled by the latter, a series of thermostats in the main circuit, each comprising two coacting hermetically-closed chambers containing a gaseous substance and of unequal thickness, a circuit-closer and an annunciator for each thermostat, and circuit-terminals leading from the source of electric energy to and controlled by the circuit-closer substantially as described.

33. In a fire-alarm apparatus the combination of a main circuit including a source of electric energy and a drop-relay, an alarm-circuit controlled by the latter, a series of thermostats in the main circuit, each comprising two coacting hermetically-closed chambers containing a gaseous substance and of unequal thickness, a circuit-closer between the chambers, and circuit-terminals leading from the source of electric energy and entering the thermostat in position for contact with said circuit-closer, and an annunciator for each thermostat substantially as described.

34. In a fire-alarm apparatus the combination of a main circuit including a source of electric energy and a drop-relay, an alarm-circuit controlled by the latter, a series of thermostats in the main circuit, each comprising two coacting hermetically-closed chambers containing a gaseous substance and of unequal thickness, a fluid circuit-closer between the chambers, and circuit-terminals leading from the source of electric energy and entering the thermostat in position for contact with said circuit-closer, and an annunciator for each thermostat substantially as described.

In testimony whereof I have hereunto set my hand in the presence of two subscribing witnesses.

HENRY GUY CARLETON.

Witnesses:
T. F. KEHOE,
G. M. BORST.